(12) United States Patent
Shih et al.

(10) Patent No.: US 10,473,300 B2
(45) Date of Patent: Nov. 12, 2019

(54) LIGHT SOURCE ASSEMBLY AND CAMERA DEVICE HAVING THE SAME

(71) Applicant: VIVOTEK INC., New Taipei (TW)

(72) Inventors: Li-Shan Shih, New Taipei (TW); Wen-Yuan Li, New Taipei (TW); Yuan-Han Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 376 days.

(21) Appl. No.: 15/478,022

(22) Filed: Apr. 3, 2017

(65) Prior Publication Data

US 2017/0307184 A1    Oct. 26, 2017

(30) Foreign Application Priority Data

Apr. 20, 2016    (TW) .............................. 105112271 A

(51) Int. Cl.
*F21V 17/02*    (2006.01)
*F21V 17/06*    (2006.01)
*G03B 15/05*    (2006.01)

(52) U.S. Cl.
CPC .............. *F21V 17/02* (2013.01); *F21V 17/06* (2013.01); *G03B 15/05* (2013.01)

(58) Field of Classification Search
CPC .......... F21V 17/02; F21V 17/06; G03B 15/05
USPC ......................................................... 362/11
See application file for complete search history.

(56) References Cited

U.S. PATENT DOCUMENTS

| 6,716,042 | B2 * | 4/2004 | Lin ........................ H01R 25/14 362/147 |
| 7,131,753 | B1 * | 11/2006 | Edwards, Jr. ........... F21S 2/005 362/405 |
| 7,586,073 | B2 * | 9/2009 | Chi ..................... G01N 21/8806 250/205 |
| 7,841,741 | B2 * | 11/2010 | Chan ..................... H05K 1/189 362/249.04 |
| 8,109,652 | B2 * | 2/2012 | Chen ................... F21V 19/0045 362/249.02 |
| 8,132,937 | B2 * | 3/2012 | Kountotsis .............. F21V 27/00 362/249.03 |
| 9,777,908 | B1 * | 10/2017 | Churnock ............... F21V 21/04 |
| 9,923,341 | B1 * | 3/2018 | Andersson ........... H01R 25/142 |
| 2008/0106892 | A1 * | 5/2008 | Griffiths .................. F21V 11/10 362/223 |
| 2008/0192462 | A1 * | 8/2008 | Steedly ............... F21V 19/0055 362/218 |

(Continued)

*Primary Examiner* — Bryon T Gyllstrom
(74) *Attorney, Agent, or Firm* — Maschoff Brennan

(57) ABSTRACT

A light source assembly comprises a base body and at least one light source module. The base body comprises a first and a second bearing base connected to each other. The first bearing base is configured for an image capture module to be disposed thereon. The second bearing base is located on the periphery of the first bearing base. The at least one light source module is slidably disposed on the second bearing base, and movable toward and away from the first bearing base. The at least one light source module forms an adjustable space. The adjustable space is configured for receiving the image capture module. The first bearing base has a first bearing surface configured for the image capture module to be disposed thereon. A sliding direction of the at least one light source module is not parallel to a normal direction of the first bearing surface.

20 Claims, 9 Drawing Sheets

(56) References Cited

U.S. PATENT DOCUMENTS

2009/0200966 A1* 8/2009 Whitehouse ........... A47B 97/00
                                                    315/309
2012/0147583 A1* 6/2012 Lai ........................ G03B 15/02
                                                    362/11

* cited by examiner

LIGHT SOURCE ASSEMBLY AND CAMERA DEVICE HAVING THE SAME

CROSS-REFERENCE TO RELATED APPLICATIONS

This non-provisional application claims priority under 35 U.S.C. § 119(a) on Patent Application No(s). 105112271 filed in Taiwan, R.O.C. on Apr. 20, 2016, the entire contents of which are hereby incorporated by reference.

TECHNICAL FIELD

The disclosure relates to a light source assembly and a camera device having the same, more particularly to a light source assembly with a movable light source, and a camera device having the same.

BACKGROUND

Generally, surveillance cameras are widely used in many places, such as factories, shops, dormitories, apartments, and communities, for recording evidence of any activity that occurs at those places for future investigation, thereby deterring potential criminal activities, and further preventing crimes from happening.

SUMMARY

One embodiment of the disclosure provides a light source assembly comprising a base body and at least one light source module. The base body comprises a first bearing base and a second bearing base connected to each other. The first bearing base is configured for an image capture module to be disposed thereon, and the second bearing base is located on the periphery of the first bearing base. The at least one light source module is slidably disposed on the second bearing base and movable toward and away from the first bearing base. The at least one light source module forms an adjustable space on the base body. The adjustable space is configured for receiving the image capture module. The first bearing base has a first bearing surface configured for the image capture module to be disposed thereon. A sliding direction of the at least one light source module is not parallel to a normal direction of the first bearing surface.

One embodiment of the disclosure provides a camera device comprising an image capture module and the light source assembly described above, wherein the image capture module is disposed in the adjustable space

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
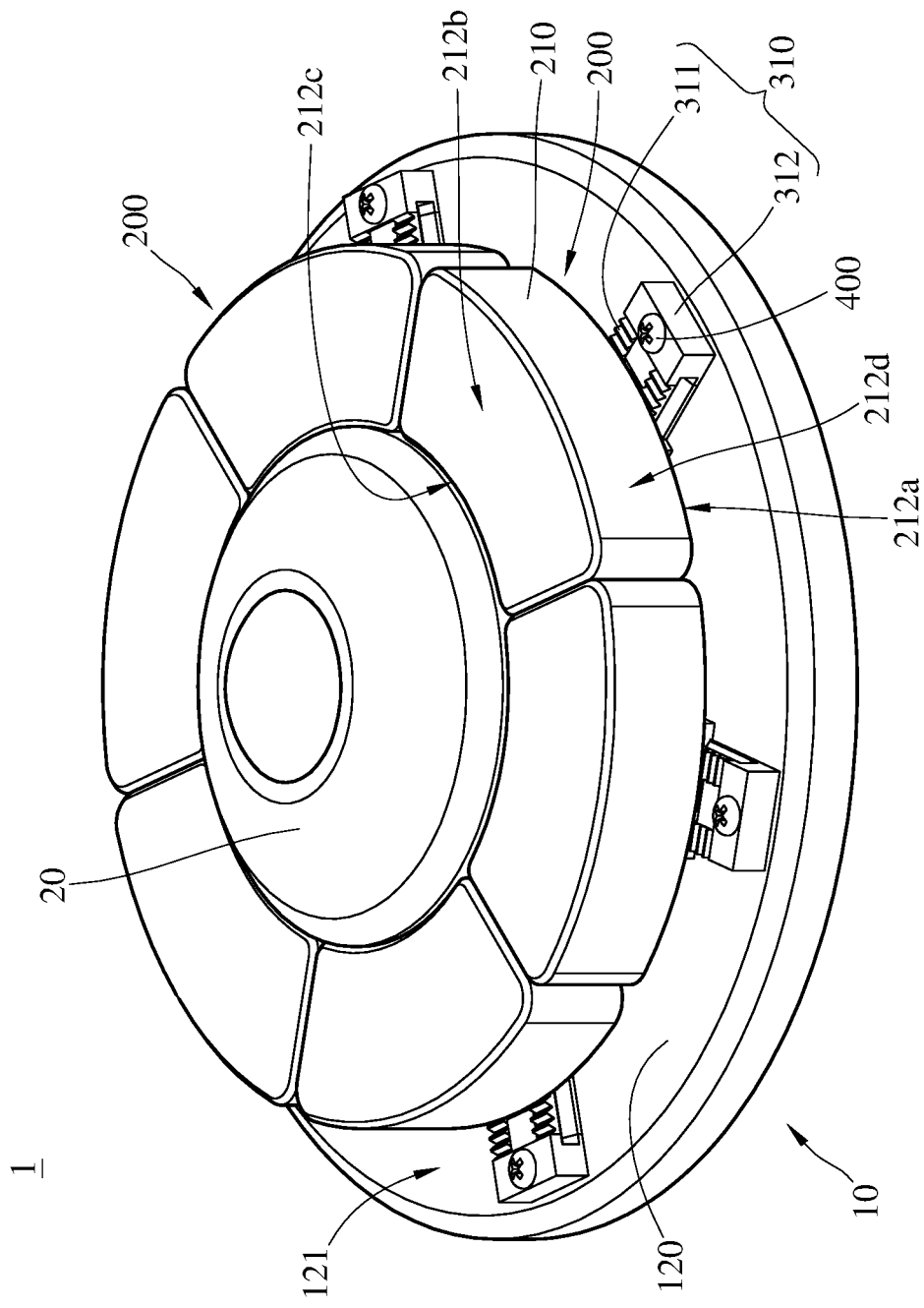
FIG. 1 is a perspective view of a camera device in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
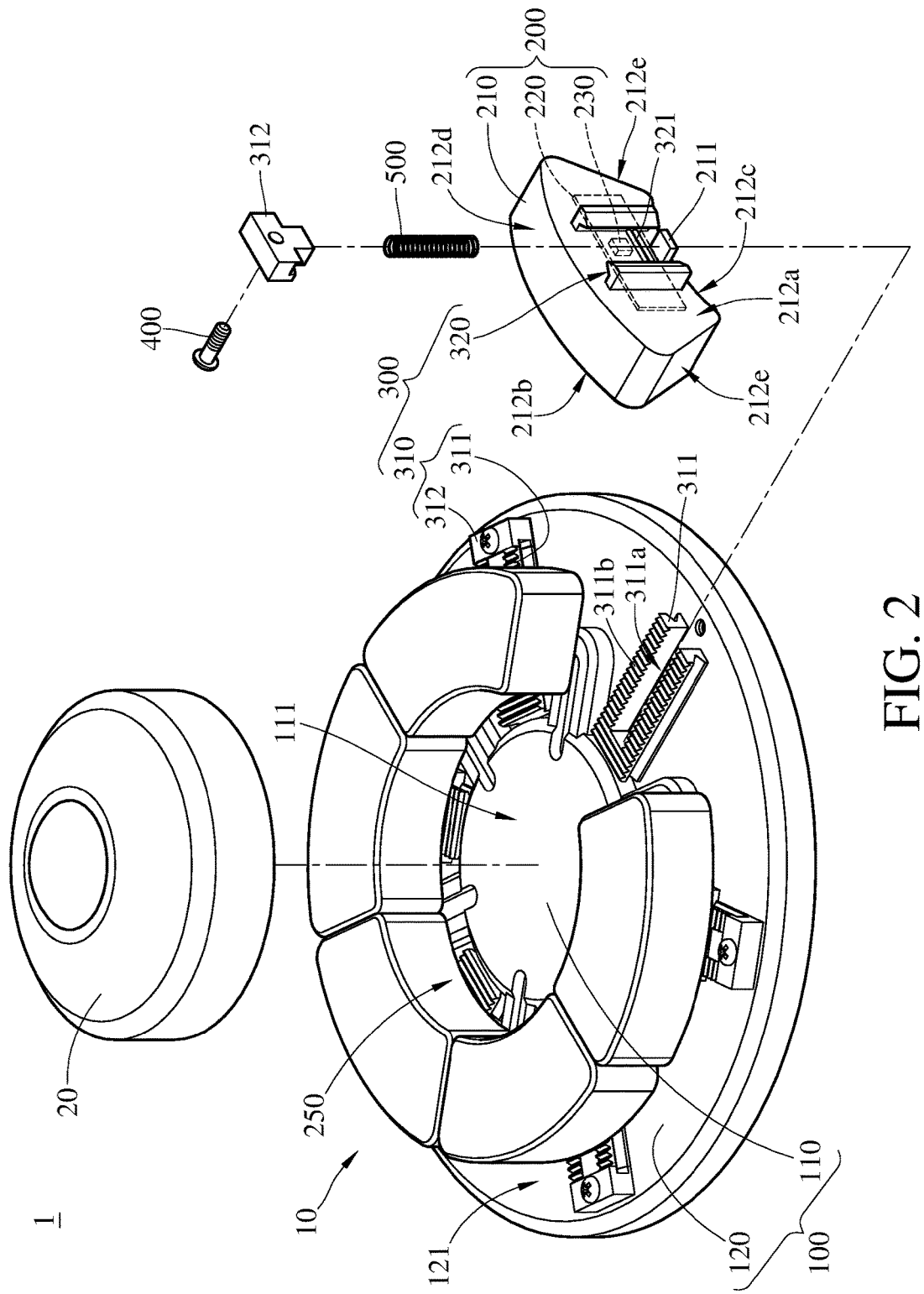
FIG. 2 is an exploded view of the camera device in FIG. 1.

Please refer to FIG. 1 and FIG. 2. FIG. 1 is a perspective view of a camera device in accordance with a first embodiment of the disclosure. FIG. 2 is an exploded view of the camera device in FIG. 1.

Figure 5:
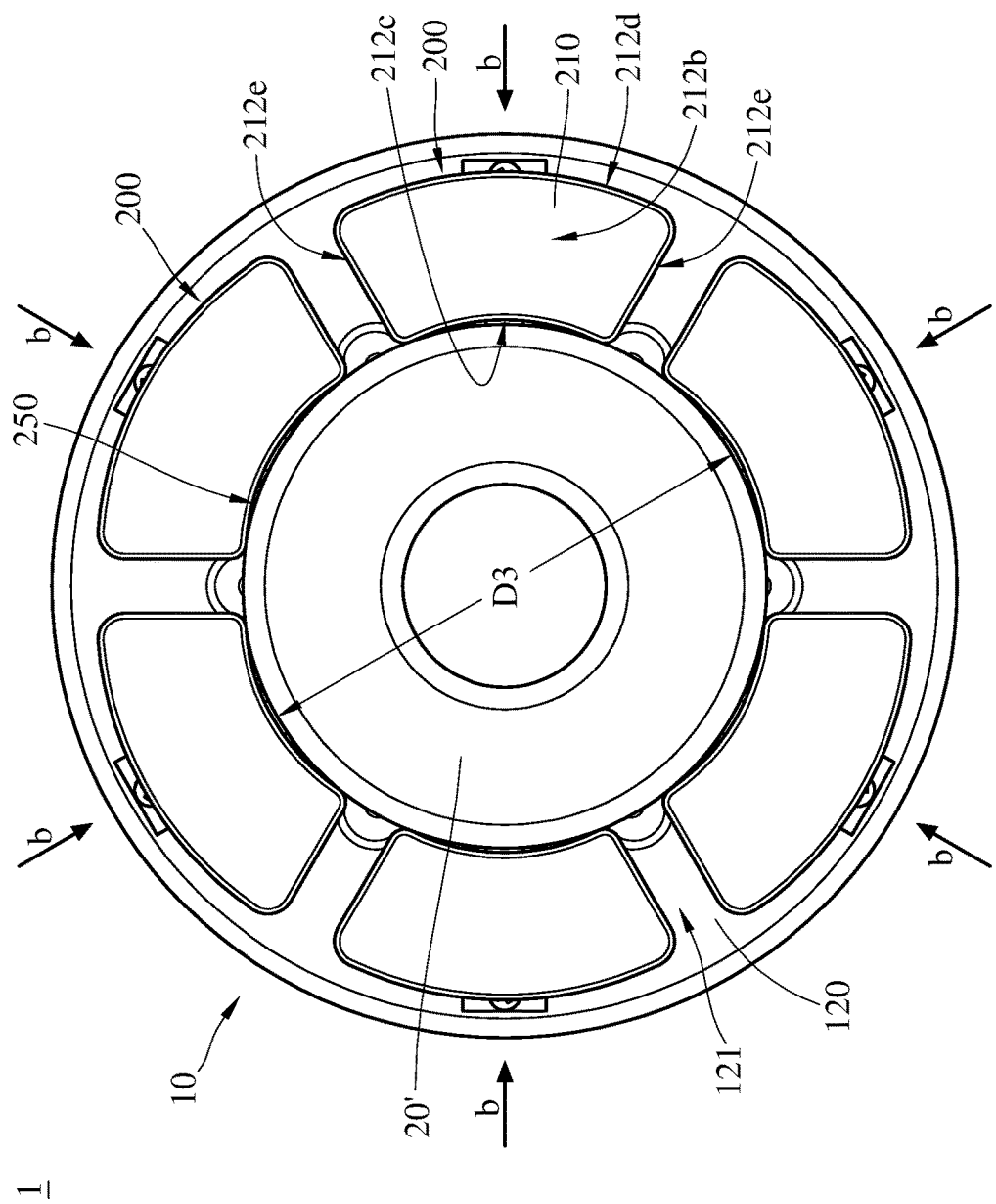
FIG. 5 is a top view of the camera device in FIG. 4 with the image capture module being disposed in a light source assembly, and the light source modules being arranged inwardly toward the center of the camera device and in contact with the image capture module.

In this embodiment, a camera device 1 is provided. The camera device 1 includes a light source assembly 10 and an image capture module. In detail, the light source assembly 10 is able to be installed with, for example, an image capture module 20 or an image capture module 20' (as shown in FIG. 5) that are different in size. Each of the image capture modules 20 and 20' is, for example, a single lens, or composed of multiple lenses. The size of the image capture module 20' is larger than the size of the image capture module 20. The installations of the image capture modules 20 and 20' are described in the following paragraphs.

The light source assembly 10 includes a base body 100 and six light source modules 200. The base body 100 includes a first bearing base 110 and a second bearing base 120 connected to each other. The first bearing base 110 is configured for disposing the image capture module 20. The first bearing base 110 has a first bearing surface 111 on one side which is close to the image capture module 20. In this embodiment, the first bearing surface 111 is configured for the image capture module 20 to be disposed thereon. The second bearing base 120 is located on the periphery of the first bearing base 110. In this embodiment, the first bearing base 110 is entirely surrounded by the second bearing base 120, but the present disclosure is not limited thereto. In other embodiments, the first bearing base 110 may be partially surrounded by the second bearing base 120.

In addition, in this embodiment, the second bearing base 120 has a second bearing surface 121. The first bearing surface 111 of the first bearing base 110 is not coplanar with the second bearing surface 121 of the second bearing base 120, but the present disclosure is not limited thereto. In other embodiments, the first bearing surface 111 of the first bearing base 110 may be coplanar with the second bearing surface 121 of the second bearing base 120.

Each light source module 200 includes a casing 210, a printed circuit board 220 and a light emitting component 230. The printed circuit board 220 and the light emitting component 230 are located in the casing 210. The light emitting component 230 is, for example, a light emitting diode (LED). The light emitting component 230 is electrically connected to the printed circuit board 220. In other words, the printed circuit board 220 and the light emitting component 230 (LED) are modularized into the light source module 200. The light source modules 200 are slidably disposed on the second bearing base 120, and surround the first bearing base 110. The light source modules 200 are movable toward and away from the first bearing base 110, and together form an adjustable space 250 on the base body 100. The adjustable space 250 is configured for receiving the image capture module 20 and the image capture module 20' that are different in size.

In detail, the light source assembly 10 further includes six slide guides 300. The slide guides 300 each include a rail 310 and a slot 320. The rails 310 protrude from the second bearing surface 121 of the second bearing base 120, and are radially arranged relative to the first bearing base 110. The slots 320 are respectively formed on the light source modules 200. The rails 310 are respectively slidably disposed on the slots 320, such that the light source modules 200 are movable relative to the base body 100. Additionally, a sliding direction of each light source module 200 is not parallel to a normal direction N of the first bearing surface 111.

In this embodiment, the rails 310 each include a support part 311 and a side-cover part 312. The support parts 311 protrude from the second bearing surface 121 of the second bearing base 120. The support parts 311 each have an accommodating space 311a on one side which is facing away from the second bearing base 120, and the accommodating space 311a extends from one side of the support part 311, which is away from the first bearing base 110, toward the first bearing base 110. The side-cover parts 312 are respectively detachably disposed on the support parts 311, and cover one side of the accommodating spaces 311a away from the first bearing base 110. The support parts 311 of the rails 310 are respectively slidably disposed on the slots 320.

In this embodiment, the light source assembly 10 further includes six fasteners 400. The fasteners 400 are, for example, bolts. The side-cover parts 312 are respectively fixed on the second bearing base 120 through the fasteners 400, but the present disclosure is not limited thereto. In other embodiments, the side-cover parts 312 may be fixed on the support parts 311 or be engaged with the support parts 311 or the second bearing base 120 by engaging members.

In this embodiment, the light source assembly 10 further includes six elastic members 500. The casings 210 of the light source modules 200 each have a push portion 211. The push portions 211 are respectively located in the accommodating spaces 311a. The elastic members 500 are respectively accommodated in the accommodating spaces 311a, and two opposite ends of each elastic member 500 respectively press against one of the push portions 211 and one of the side-cover parts 312. By the elastic members 500, the light source assemblies 10 are driven to move in a direction pointing the first bearing base 110, and are pressed against the image capture module 20.

In addition, in this embodiment, the support parts 311 each have a first toothed structure 311b, and there is a second toothed structure 321 in each of the slots 320. The second toothed structures 321 are respectively pressed against the first toothed structures 311b, such that a "kakaka" sound and a vibration are generated while the rails 310 are moved relative to the slots 320, but the present disclosure is not limited thereto. In other embodiments, the support parts of the rails and the slots may not have the first toothed structure and the second toothed structure.

In addition, the casings 210 of the light source modules 200 each have a bottom surface 212a, a top surface 212b, an inner surface 212c, an outer surface 212d and two side surfaces 212e. The bottom surface 212a faces the base body 100. The top surface 212b and the bottom surface 212a are opposite to each other. The inner surface 212c is closer to the first bearing base 110 than the outer surface 212d is to the first bearing base 110. The two side surfaces 212e are located between and connected to the inner surface 212c and the outer surface 212d. In addition, the top surface 212b and the outer surface 212d are pervious to light. The bottom surface 212a, the inner surface 212c and the two side surfaces 212e are impervious to light, but the present disclosure is not limited thereto. In other embodiments, the bottom surface 212a, the inner surface 212c and the two side surfaces 212e may be pervious to light, or be cased over with light reflecting layers for reflecting the light projecting toward the bottom surface 212a, the inner surface 212c and the two side surfaces 212e in order to increase utilization of light from the light emitting component 230.

In this embodiment, the light source assembly 10 includes six light source modules 200, but the present disclosure is not limited thereto. In other embodiments, the light source assembly may include more or less light source modules than are shown in FIG. 1. Also, it is understood that the quantities of the slide guides, the fasteners and the elastic members may be changed according to the quantity of the light source modules.

Figure 3:
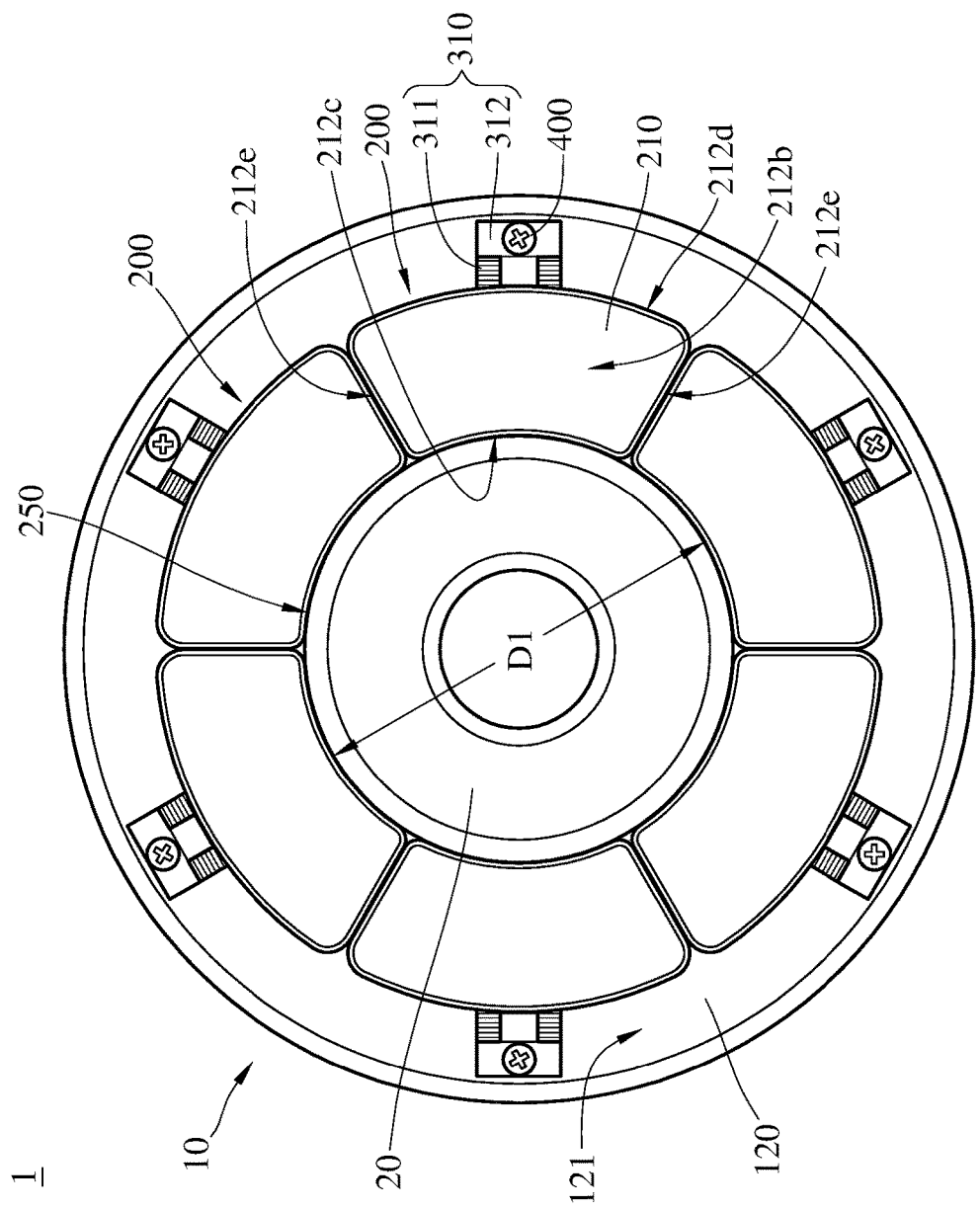
FIG. 3 is a top view of the camera device in FIG. 1.
Figure 4:
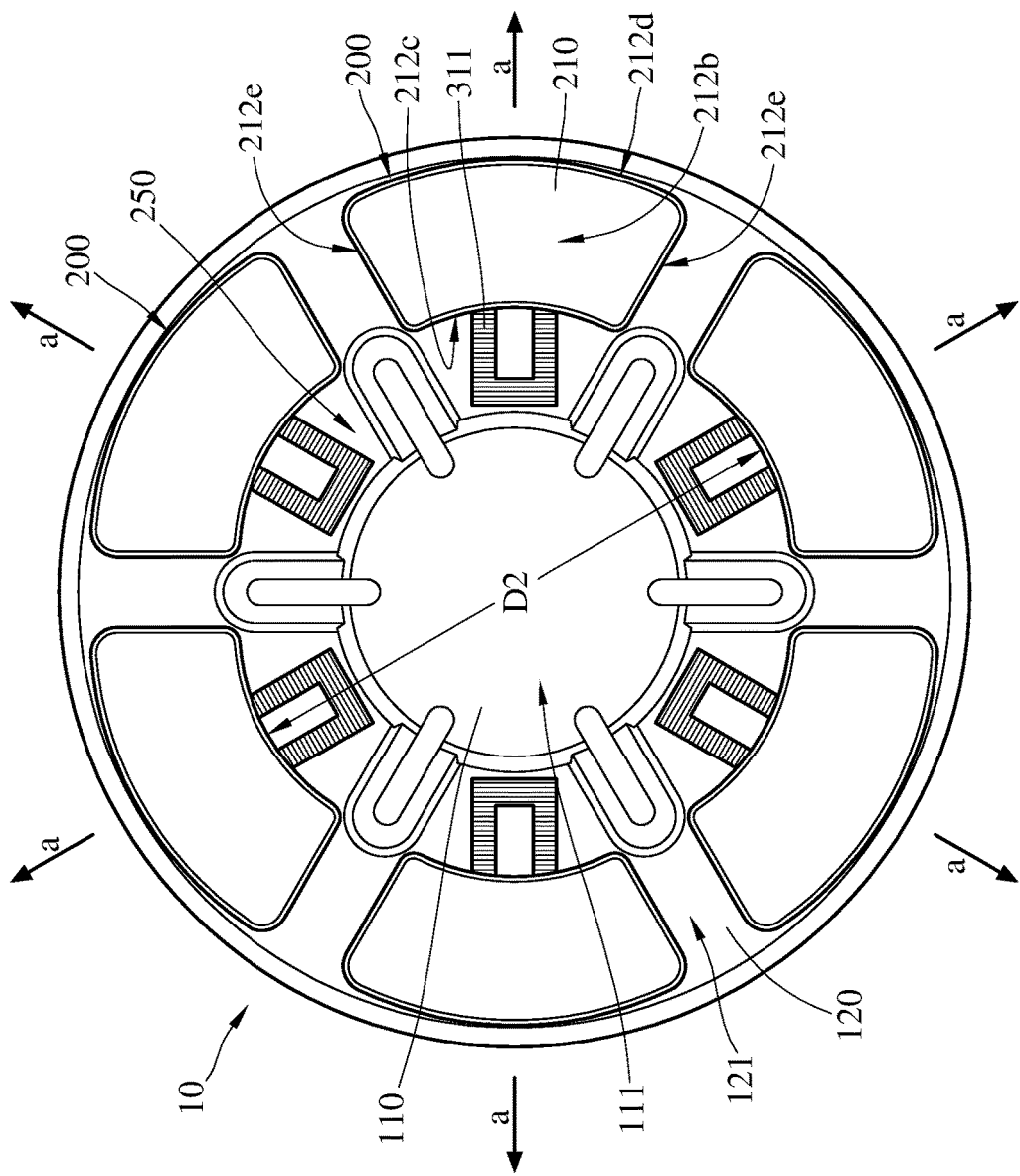
FIG. 4 is a top view of the camera device in FIG. 1 without an image capture module, and with light source modules being pulled outward away from the center of the camera device.

Please refer to FIG. 2 to FIG. 5. FIG. 3 is a top view of the camera device in FIG. 1. FIG. 4 is a top view of the camera device in FIG. 1 without an image capture module, and with light source modules being pulled outward away from the center of the camera device. FIG. 5 is a top view of the camera device in FIG. 4 with the image capture module being disposed in a light source assembly, and the light source modules being arranged inwardly toward the center of the camera device and in contact with the image capture module.

Then, how the light source assembly 10 is installed with the image capture modules 20 and 20' is described in the following paragraphs.

Firstly, as shown in FIG. 2 and FIG. 3, the light source assembly 10 is installed with the image capture module 20 which is smaller than the image capture module 20'. The image capture module 20 is disposed on the first bearing base 110. By the elastic members 500, the light source modules 200 are moved inward towards the center of the image capture module 20, and are pressed against the image capture module 20. As a result, a diameter D1 of the adjustable space 250 formed by the light source modules 200 is substantially equal to an outer diameter of the image capture module 20. Accordingly, there is nearly no gap between the light source modules 200 and the image capture module 20, thereby enhancing the aesthetics of the camera device 1.

Then, as shown in FIG. 2 and FIG. 4, the light source assembly 10 is installed with the image capture module 20' which is larger than the image capture module 20. As shown in FIG. 2 and FIG. 4, each of the light source modules 200 is pulled outwardly in a direction of an arrow a in order to expand the adjustable space 250, so that a diameter D2 of the adjustable space 250 is greater than an outer diameter of the image capture module 20'.

Then, as shown in FIG. 2 and FIG. 5, the image capture module 20' is put in the adjustable space 250 and disposed on the first bearing base 110. Then, the light source modules 200 are released, so that each of light source modules 200 is moved in a direction of an arrow b to be pressed against the image capture module 20' by elastic force of the elastic members 500. As a result, a diameter D3 of the adjustable space 250 formed by the light source modules 200 is substantially equal to the outer diameter of the image capture module 20'.

Accordingly, the light source assembly 10 is not only able to be installed with different size image capture modules but also aesthetic.

Figure 6:
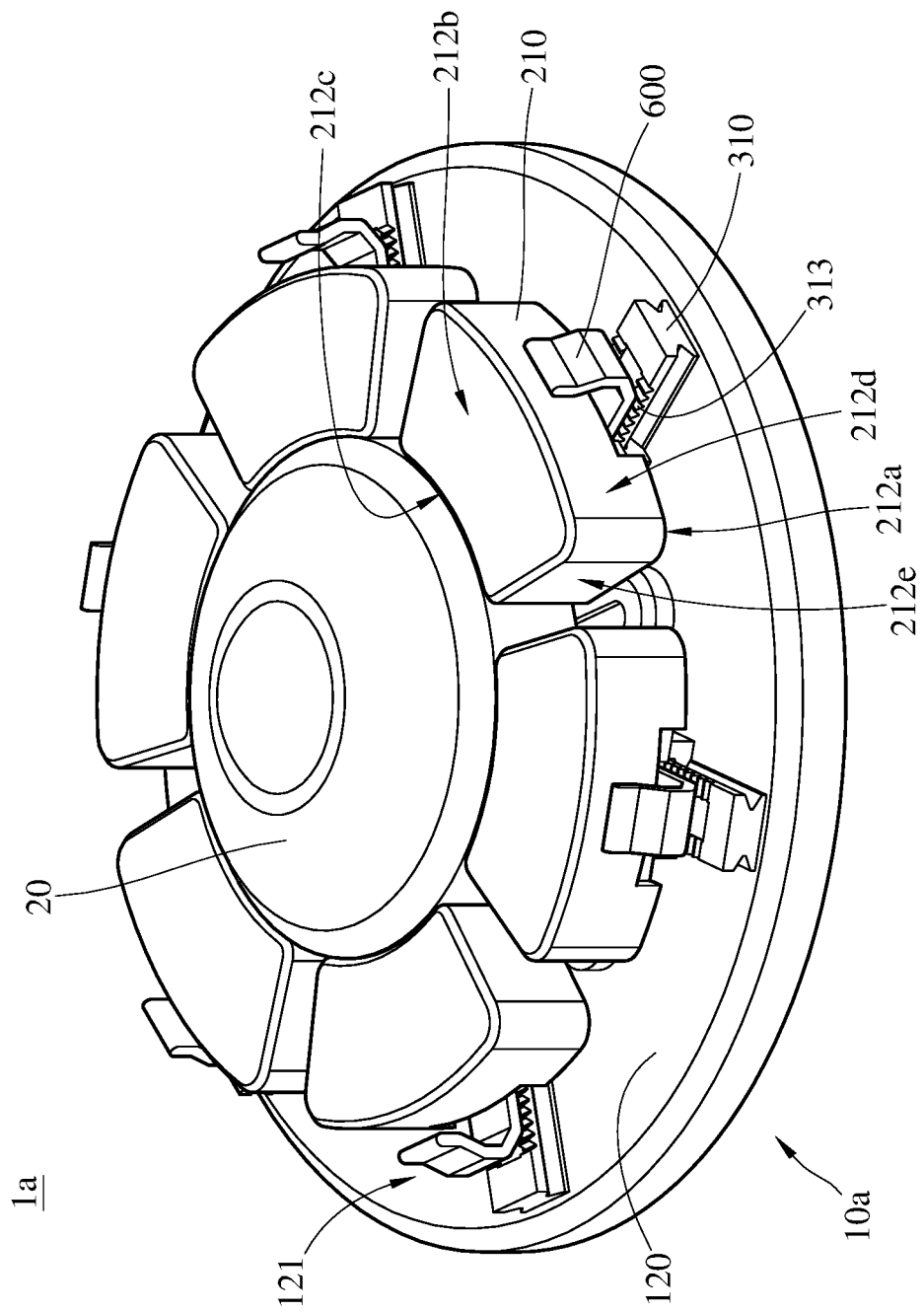
FIG. 6 is a perspective view of a camera device in accordance with a second embodiment of the disclosure.
Figure 7:
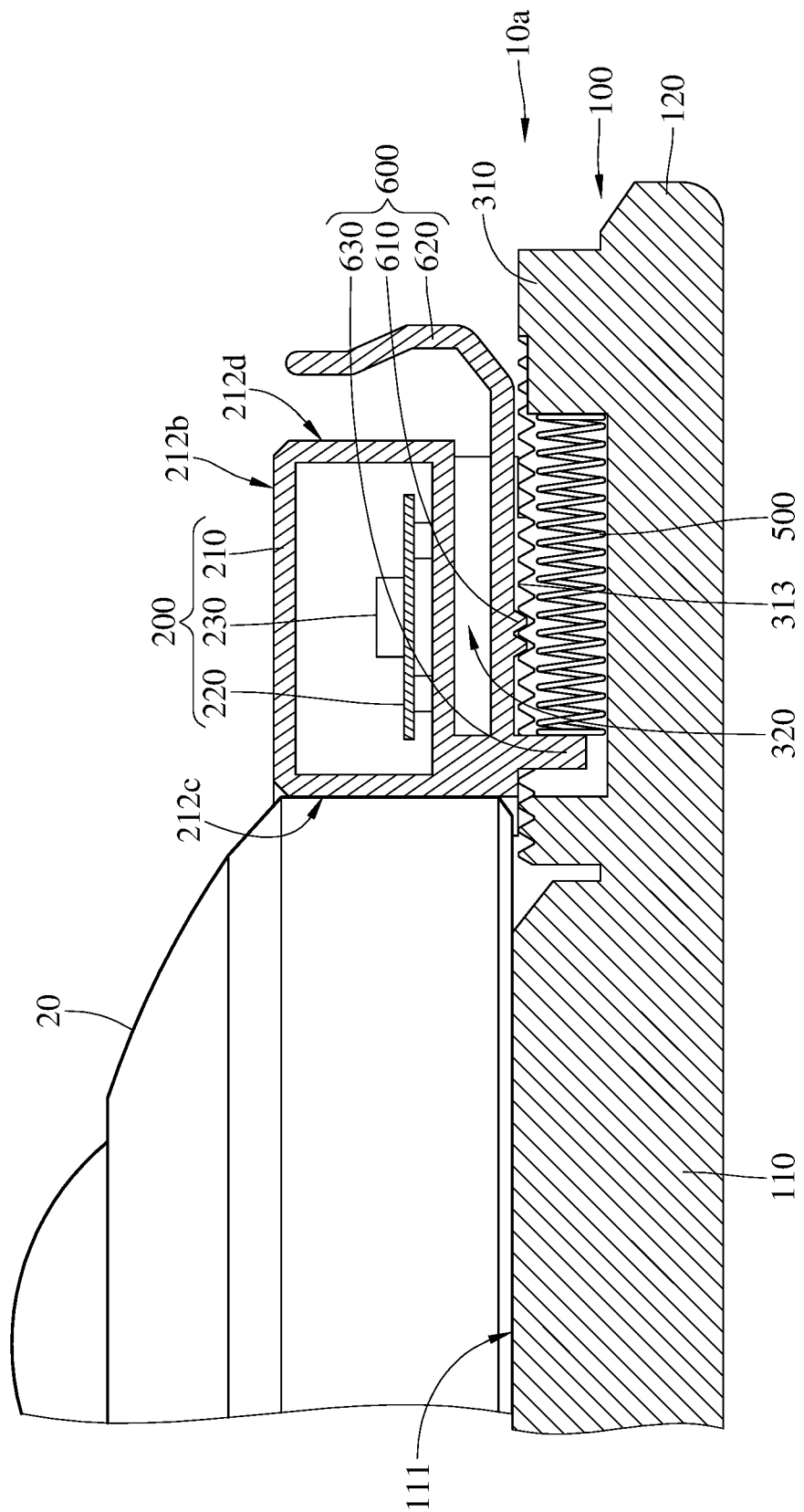
FIG. 7 is a partial and cross-sectional view of the camera device in FIG. 6.

Please refer to FIG. 6 and FIG. 7. FIG. 6 is a perspective view of a camera device in accordance with a second embodiment of the disclosure. FIG. 7 is a partial and cross-sectional view of the camera device in FIG. 6. The second embodiment is similar to the first embodiment, so only the differences between the two embodiments are described herein.

In this embodiment, a camera device 1a is provided. The camera device 1a includes a light source assembly 10a and an image capture module 20.

The light source assembly 10a includes a base body 100, six light source modules 200, six slide guides 300 and six positioning members 600. In this embodiment, the base body 100 and the light source modules 200 are respectively similar to the base body 100 and the light source modules 200 in the first embodiment, so the similarities are not repeated again.

The slide guides 300 each include a rail 310 and a slot 320. The rails 310 protrude from the second bearing surface 121 of the second bearing base 120, and are radially arranged relative to the first bearing base 110. The rails 310 each have a positioning structure 313 on one side which is facing away from the second bearing base 120. The slots 320 are respectively formed on the light source modules 200. The rails 310 are respectively slidably disposed on the slots 320, such that the light source modules 200 are movable relative to the base body 100. Additionally, a sliding direction of each of the light source modules 200 is not parallel to a normal direction N of the first bearing surface 111.

The positioning members 600 each include a positioning part 610, a releasing part 620 and a push part 630. The positioning parts 610 are respectively located in the slots 320. Each of positioning parts 610 is engaged with a part of one of the positioning structures 313. The releasing parts 620 are respectively connected to one end of the positioning parts 610, and extend in a direction pointing away from the second bearing base 120. The releasing parts 620 are able to be moved relative to the light source modules 200 so as to drive the positioning parts 610 to move toward and away from the second bearing base 120. The push parts 630 extend in a direction pointing from the positioning parts 610 toward the second bearing base 120, and are respectively located in the accommodating spaces 311a. Two opposite ends of each of elastic members 500 respectively press against one of the push parts 630 and one of the rails 310.

In this embodiment, the light source assembly 10a includes six light source modules 200, but the present disclosure is not limited thereto. In other embodiments, the light source assembly may include more or less light source modules than are shown in FIG. 6. Also, it is understood that the quantities of the slide guides and the positioning members may be changed according to the quantity of the light source modules.

Figure 8:
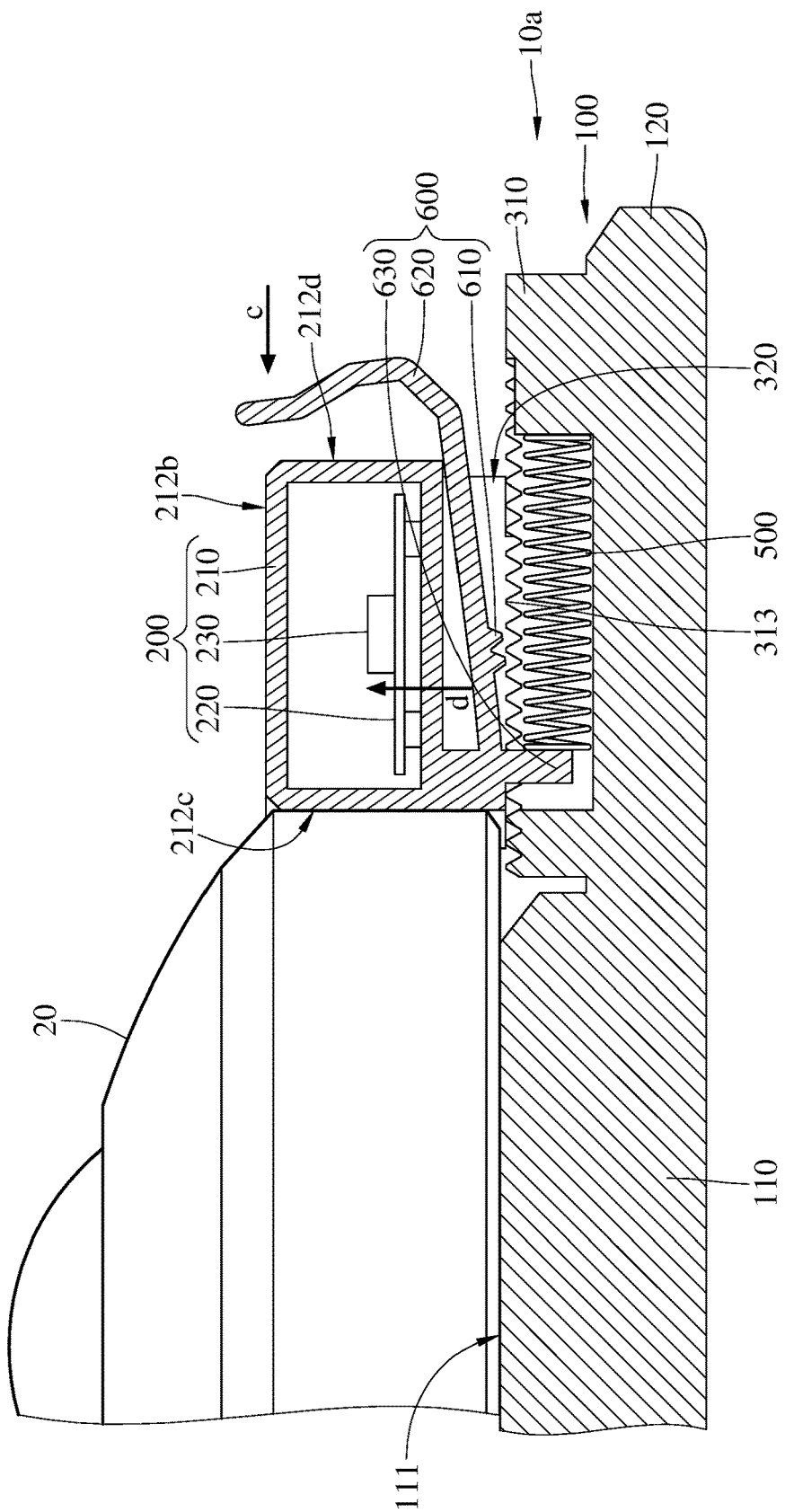
FIG. 8 and FIG. 9 show the operation of a light source assembly of the camera device in FIG. 7.
Figure 9:
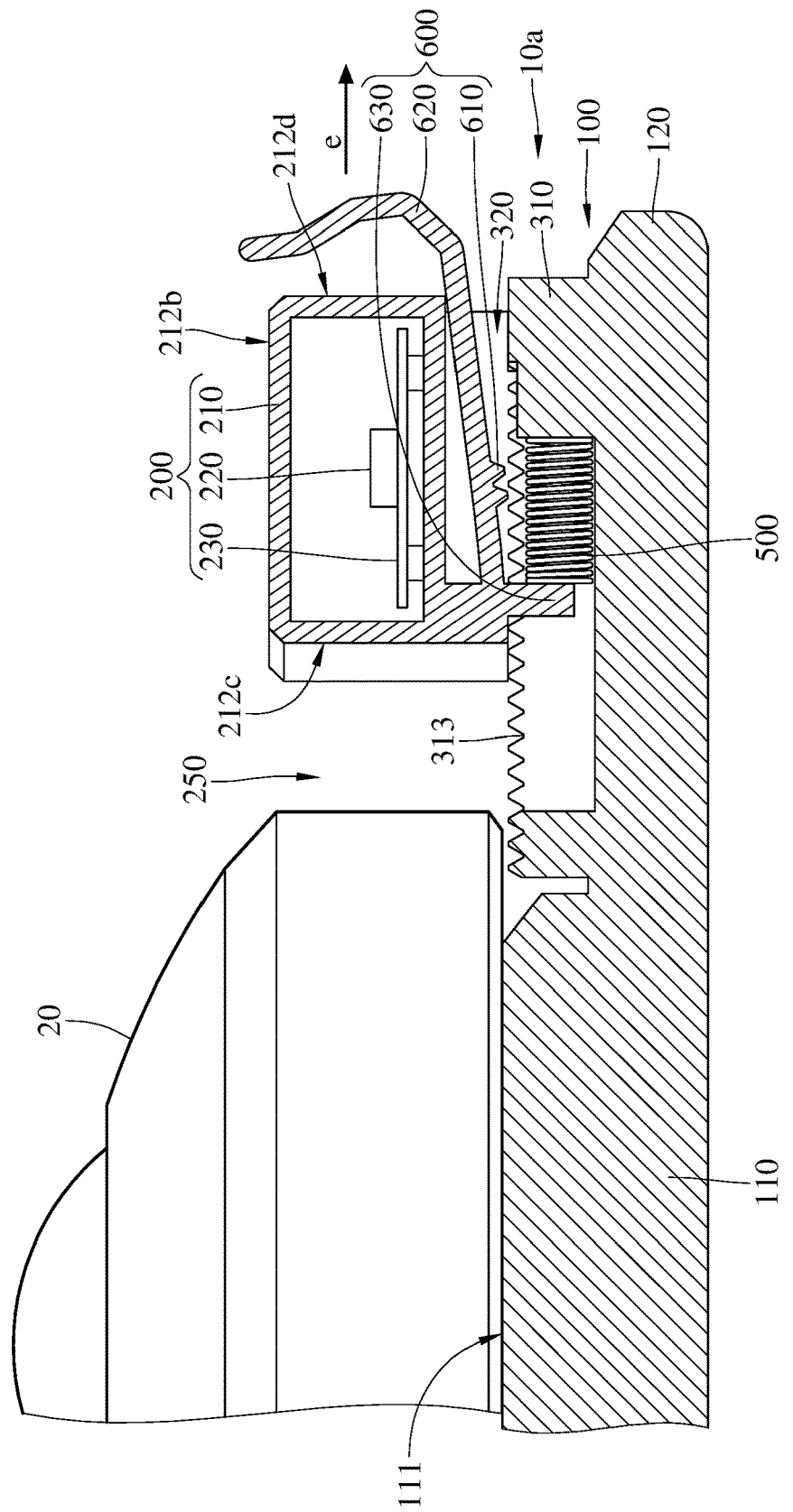

Please refer to FIG. 7 to FIG. 9. FIG. 8 and FIG. 9 show the operation of a light source assembly of the camera device in FIG. 7.

As shown in FIG. 7, when the releasing part 620 of the positioning member 600 is not applied with an external force, the positioning part 610 of the positioning member 600 is engaged with the positioning structure 313 of the rail 310, such that the light source module 200 is fixed in place and stays pressed against the image capture module 20.

When replacing the image capture module 20, as shown in FIG. 8, the releasing part 620 of the positioning member 600 is applied with a force in a direction of an arrow c so as to drive the positioning part 610 to move in a direction of an arrow d to disengage from the positioning structure 313 of the rail 310. Therefore, the light source module 200 is disengaged from the base body 100 and is able to be moved relative to the base body 100.

Then, as shown in FIG. 9, the light source module 200 is moved in a direction of an arrow e relatively to the base body 100 in order to expand the adjustable space. Therefore, the image capture module 20 is able to be removed and replaced with a larger image capture module.

According to the light source assembly and the camera device having the same as described above, since the light source modules are movably disposed on the base body so as to adjust the adjustable space for receiving the image capture module, the light source assembly is capable of receiving different size image capture modules. Therefore, burden of production on the manufacturers is reduced.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A light source assembly, comprising:
  a base body comprising a first bearing base and a second bearing base connected to each other, the first bearing base configured for an image capture module to be disposed thereon, and the second bearing base located on the periphery of the first bearing base;
  a plurality of light source modules slidably disposed on the second bearing base, the plurality of light source modules surrounding the first bearing base, the plurality of light source modules movable toward and away from the first bearing base, and the plurality of light source modules forming an adjustable space on the base body;
  a plurality of slide guides, each of the plurality of slide guides comprising a rail and a slot, the rails protruding from the second bearing base, the rails radially arranged relative to the first bearing base, the slots respectively disposed on the plurality of light source modules, and the rails respectively slidably disposed on the slots; and
  a plurality of positioning members, each of the plurality of positioning members comprising a positioning part and a releasing part, each of the rails having a positioning structure, the positioning parts respectively located in the slots, the positioning parts respectively engaged with a part of the positioning structure of each of the rails, the releasing part connected to one end of the positioning part, each of the releasing parts extending in a direction pointing away from the second bearing base; when a force is applied on the releasing parts in a direction pointing from the second bearing base toward the first bearing base, the releasing parts respectively drives the positioning parts to disengage from the positioning structures;
  wherein, the adjustable space is configured for receiving the image capture module, the first bearing base has a first bearing surface, the first bearing surface is configured for the image capture module to be disposed thereon, and a sliding direction of each of the plurality of light source modules is not parallel to a normal direction of the first bearing surface.

2. The light source assembly according to claim 1, further comprising a plurality of elastic members, each of the rails having an accommodating space, each of the plurality of positioning members further comprising a push part connected to the positioning part, each of the push parts extending in a direction pointing from the positioning part toward the second bearing base, the push parts respectively located in the accommodating spaces, the plurality of elastic members respectively accommodated in the accommodating spaces, and two opposite ends of each of the plurality of elastic members respectively pressing against one of the push parts and one of the rails.

3. The light source assembly according to claim 1, wherein each of the rails comprises a support part and a side-cover part, the support part is fixed on the second bearing base, the support part has an accommodating space; the side-cover part is detachably disposed on the support part, and covers one side of the accommodating space; and the support parts of the rails are respectively slidably disposed on the slots.

4. The light source assembly according to claim 3, further comprising a plurality of elastic members, each of the plurality of light source modules having a push portion, the push portions respectively located in the accommodating spaces, the plurality of elastic members respectively accommodated in the accommodating spaces, and two opposite ends of each of the plurality of elastic members respectively pressing against one of the push portions and one of the side-cover parts.

5. The light source assembly according to claim 3, further comprising a plurality of fasteners, and the side-cover parts being fixed on the second bearing base through the plurality of fasteners.

6. The light source assembly according to claim 1, wherein each of the plurality of light source modules comprises a casing, a printed circuit board and a light emitting component, the printed circuit board and the light emitting component are located in the casing, and the light emitting component is electrically connected to the printed circuit board.

7. The light source assembly according to claim 6, wherein the casing has a bottom surface, a top surface, an inner surface, an outer surface and two side surfaces, the bottom surface faces the base body, the top surface and the bottom surface are opposite to each other, the inner surface is closer to the first bearing base than the outer surface is to the first bearing base, the two side surfaces are located between and connected to the inner surface and the outer surface, the top surface and the outer surface are pervious to light, and the bottom surface, the inner surface and the two side surfaces are impervious to light.

8. A camera device, comprising:
an image capture module; and
the light source assembly according to claim 1;
wherein, the image capture module is disposed in the adjustable space.

9. The light source assembly according to claim 8, further comprising a plurality of elastic members, each of the rails having an accommodating space, each of the plurality of positioning members further comprising a push part connected to the positioning part, each of the push parts extending in a direction pointing from the positioning part toward the second bearing base, the push parts respectively located in the accommodating spaces, the plurality of elastic members respectively accommodated in the accommodating spaces, and two opposite ends of each of the plurality of elastic members respectively pressing against one of the push parts and one of the rails.

10. The light source assembly according to claim 8, wherein each of the rails comprises a support part and a side-cover part, the support part is fixed on the second bearing base, the support part has an accommodating space; the side-cover part is detachably disposed on the support part, and covers one side of the accommodating space; and the support parts of the rails are respectively slidably disposed on the slots.

11. The light source assembly according to claim 10, further comprising a plurality of elastic members, each of plurality of the light source modules having a push portion, the push portions respectively located in the accommodating spaces, the plurality of elastic members respectively accommodated in the accommodating spaces, and two opposite ends of each of the plurality of elastic members respectively pressing against one of the push portions and one of the side-cover parts.

12. The light source assembly according to claim 10, further comprising a plurality of fasteners, and the side-cover parts being fixed on the second bearing base through the plurality of fasteners.

13. The light source assembly according to claim 8, wherein each of the plurality of light source modules comprises a casing, a printed circuit board and a light emitting component, the printed circuit board and the light emitting component are located in the casing, and the light emitting component is electrically connected to the printed circuit board.

14. The light source assembly according to claim 13, wherein the casing has a bottom surface, a top surface, an inner surface, an outer surface and two side surfaces, the bottom surface faces the base body, the top surface and the bottom surface are opposite to each other, the inner surface is closer to the first bearing base than the outer surface is to the first bearing base, the two side surfaces are located between and connected to the inner surface and the outer surface, the top surface and the outer surface are pervious to light, and the bottom surface, the inner surface and the two side surfaces are impervious to light.

15. A light source assembly, comprising:
a base body comprising a first bearing base and a second bearing base connected to each other, the first bearing base configured for an image capture module to be disposed thereon, and the second bearing base located on the periphery of the first bearing base;
a plurality of light source modules slidably disposed on the second bearing base, the plurality of light source modules surrounding the first bearing base, the plurality of light source modules movable toward and away from the first bearing base, and the plurality of light source modules forming an adjustable space on the base body; and
a plurality of slide guides, each of the plurality of slide guides comprising a rail and a slot, the rails protruding from the second bearing base, the rails radially arranged relative to the first bearing base, the slots respectively disposed on the plurality of light source modules, and the rails respectively slidably disposed on the slots;
wherein each of the rails comprises a support part and a side-cover part, the support part is fixed on the second bearing base, the support part has an accommodating space; the side-cover part is detachably disposed on the support part, and covers one side of the accommodating space; and the support parts of the rails are respectively slidably disposed on the slots;

wherein the adjustable space is configured for receiving the image capture module, the first bearing base has a first bearing surface, the first bearing surface is configured for the image capture module to be disposed thereon, and a sliding direction of each of the plurality of light source modules is not parallel to a normal direction of the first bearing surface.

16. The light source assembly according to claim 15, further comprising a plurality of positioning members, each of the plurality of positioning members comprising a positioning part and a releasing part, each of the rails having a positioning structure, the positioning parts respectively located in the slots, the positioning parts respectively engaged with a part of the positioning structure of each of the rails, the releasing part connected to one end of the positioning part, each of the releasing parts extending in a direction pointing away from the second bearing base; when a force is applied on the releasing parts in a direction pointing from the second bearing base toward the first bearing base, the releasing parts respectively drives the positioning parts to disengage from the positioning structures.

17. The light source assembly according to claim 16, further comprising a plurality of elastic members, each of the plurality of positioning members further comprising a push part connected to the positioning part, each of the push parts extending in a direction pointing from the positioning part toward the second bearing base, the push parts respectively located in the accommodating spaces, the plurality of elastic members respectively accommodated in the accommodating spaces, and two opposite ends of each of the plurality of elastic members respectively pressing against one of the push parts and one of the rails.

18. The light source assembly according to claim 15, further comprising a plurality of elastic members, each of the plurality of light source modules having a push portion, the push portions respectively located in the accommodating spaces, the plurality of elastic members respectively accommodated in the accommodating spaces, and two opposite ends of each of the plurality of elastic members respectively pressing against one of the push portions and one of the side-cover parts.

19. The light source assembly according to claim 15, further comprising a plurality of fasteners, and the side-cover parts being fixed on the second bearing base through the plurality of fasteners.

20. The light source assembly according to claim 15, wherein each of the plurality of light source modules comprises a casing, a printed circuit board and a light emitting component, the printed circuit board and the light emitting component are located in the casing, the light emitting component is electrically connected to the printed circuit board, the casing has a bottom surface, a top surface, an inner surface, an outer surface and two side surfaces, the bottom surface faces the base body, the top surface and the bottom surface are opposite to each other, the inner surface is closer to the first bearing base than the outer surface is to the first bearing base, the two side surfaces are located between and connected to the inner surface and the outer surface, the top surface and the outer surface are pervious to light, and the bottom surface, the inner surface and the two side surfaces are impervious to light.

* * * * *